United States Patent
Hellenbrand

(10) Patent No.: US 9,498,798 B2
(45) Date of Patent: Nov. 22, 2016

(54) PIECE GOODS SEPARATING APPARATUS

(71) Applicant: CareFusion Germany 326 GmbH, Kelberg (DE)

(72) Inventor: Christoph Hellenbrand, Kaifenheim (DE)

(73) Assignee: CareFusion Germany 326 GmbH, Kelberg (DE)

( * ) Notice: Subject to any disclaimer, the term of this patent is extended or adjusted under 35 U.S.C. 154(b) by 0 days.

(21) Appl. No.: 14/598,542

(22) Filed: Jan. 16, 2015

(65) Prior Publication Data

US 2016/0207072 A1 Jul. 21, 2016

(51) Int. Cl.
*B07C 5/00* (2006.01)
*B07C 5/36* (2006.01)
*B65G 37/00* (2006.01)

(52) U.S. Cl.
CPC .............. *B07C 5/362* (2013.01); *B07C 5/00* (2013.01); *B65G 37/00* (2013.01)

(58) Field of Classification Search
CPC .......... B07C 5/00; B07C 5/362; B65G 37/00
USPC ....................................................... 209/552
See application file for complete search history.

(56) References Cited

U.S. PATENT DOCUMENTS

| | | | | |
|---|---|---|---|---|
| 6,464,065 B2 * | 10/2002 | Herubel | ............... | B65G 47/682 198/347.4 |
| 7,168,696 B2 * | 1/2007 | Zattler | .................. | B65G 15/14 271/10.07 |
| 7,210,280 B2 * | 5/2007 | Cottone | ................. | B65G 67/20 198/373 |
| 7,464,822 B2 * | 12/2008 | Coffelt | ..................... | B07C 3/00 198/370.03 |
| 8,827,623 B2 * | 9/2014 | Stelter | ....................... | B64F 1/32 198/588 |
| 2006/0144763 A1 * | 7/2006 | Coffelt | ..................... | B07C 3/00 209/584 |
| 2013/0026005 A1 * | 1/2013 | Senn | .................... | B65G 47/082 198/465.2 |
| 2014/0083058 A1 * | 3/2014 | Issing | ................. | B65G 1/1378 53/473 |
| 2015/0104286 A1 * | 4/2015 | Hansl | .................. | B65G 1/1378 414/800 |
| 2015/0231671 A1 * | 8/2015 | Miyasaka | ............... | B07C 5/365 209/552 |

\* cited by examiner

*Primary Examiner* — Terrell Matthews
(74) *Attorney, Agent, or Firm* — McDermott Will & Emery LLP

(57) ABSTRACT

An apparatus and method for separating piece goods to be stored in an automated storage facility are provided. At least two bearing surfaces for receiving piece goods are engaged with a conveying system for filling the bearing surfaces with piece goods, the conveying system having transfer surfaces dedicated to the bearing surfaces. The bearing surfaces may be filled with piece goods separately from one another. A control unit is coupled to the conveying system and a detection device is coupled to the control unit for detecting the position, orientation, and package data of the piece goods. A handling mechanism is also coupled to the control unit for gripping piece goods from the bearing surfaces and depositing the piece goods on a transfer device.

15 Claims, 6 Drawing Sheets

PIECE GOODS SEPARATING APPARATUS

BACKGROUND

The disclosed embodiments relate to an apparatus and methods for separating piece goods to be stored in an automated storage facility, and in particular, for separating pharmaceutical packages.

In many medical treatment settings, it is desirable to provide an apparatus and processes for separating piece goods to be stored in an automated storage facility having a high separation capacity. For example, a piece goods separating device or apparatus for separating pharmaceutical or medical packages to be stored in a pharmaceutical or medical automated storage facility.

SUMMARY

The disclosed embodiments provide an apparatus for separating piece goods to be stored in an automated storage facility. The apparatus includes at least two bearing surfaces configured to receive piece goods. The apparatus also includes a conveying system configured to provide the piece goods to the bearing surfaces, the conveying system comprising one or more transfer surfaces dedicated to the bearing surfaces and configured to transfer the piece goods to the bearing surfaces. The apparatus further includes a control unit coupled to the conveying system, the control unit configured to actuate the conveying system for a targeted provision of the piece goods to the bearing surfaces. The apparatus also includes a detection device coupled to the control unit, the detection device configured to detect a position, an orientation, and package data of the piece goods. The apparatus further includes a handling mechanism coupled to the control unit, the handling device configured to grip the piece goods on the bearing surfaces and deposit the piece goods on a transport device.

The disclosed embodiments also provide a method for separating piece goods using a piece goods separating apparatus. The method includes providing a conveying system with piece goods, the conveying system comprising a first conveying path and a second conveying path. The method also includes, via the first conveying path, moving first piece goods onto a first bearing surface by the conveying system; determining the position and orientation of the first piece goods on the first bearing surface; gripping the first piece goods from the first bearing surface by a handling mechanism; conveying the first piece goods to a detection device; reading, by the detection device, data of the first piece goods; and depositing the first piece goods on a transport device by the handling mechanism. The method further includes, via the second conveying path, moving second piece goods onto a second bearing surface by the conveying system; determining the position and orientation of the second piece goods on the second bearing surface; gripping the second piece goods from the second bearing surface by a handling mechanism; conveying the second piece goods to the detection device; reading, by the detection device, data of the second piece goods; and depositing the second piece goods on the transport device by the handling mechanism. The steps of the two conveying paths are time-coordinated with one another such that the gripping, conveying and reading of the first piece goods are carried out consecutively in relation to the gripping, conveying and reading of the second piece goods.

The disclosed embodiments provide a device for separating piece goods. The device includes a plurality of bearing surfaces configured to receive piece goods. The device also includes a conveying system configured to provide the piece goods to the plurality of bearing surfaces. The device further includes a control unit configured to control a targeted provision of the piece goods to the plurality of bearing surfaces. The device also includes a detection device configured to detect at least one of a position, an orientation, and package data of the piece goods. The device further includes a handling mechanism configured to grip and deposit the piece goods on a transport device.

The foregoing and other features, aspects and advantages of the disclosed embodiments will become more apparent from the following detailed description and accompanying drawings.

DETAILED DESCRIPTION

Figure 1:
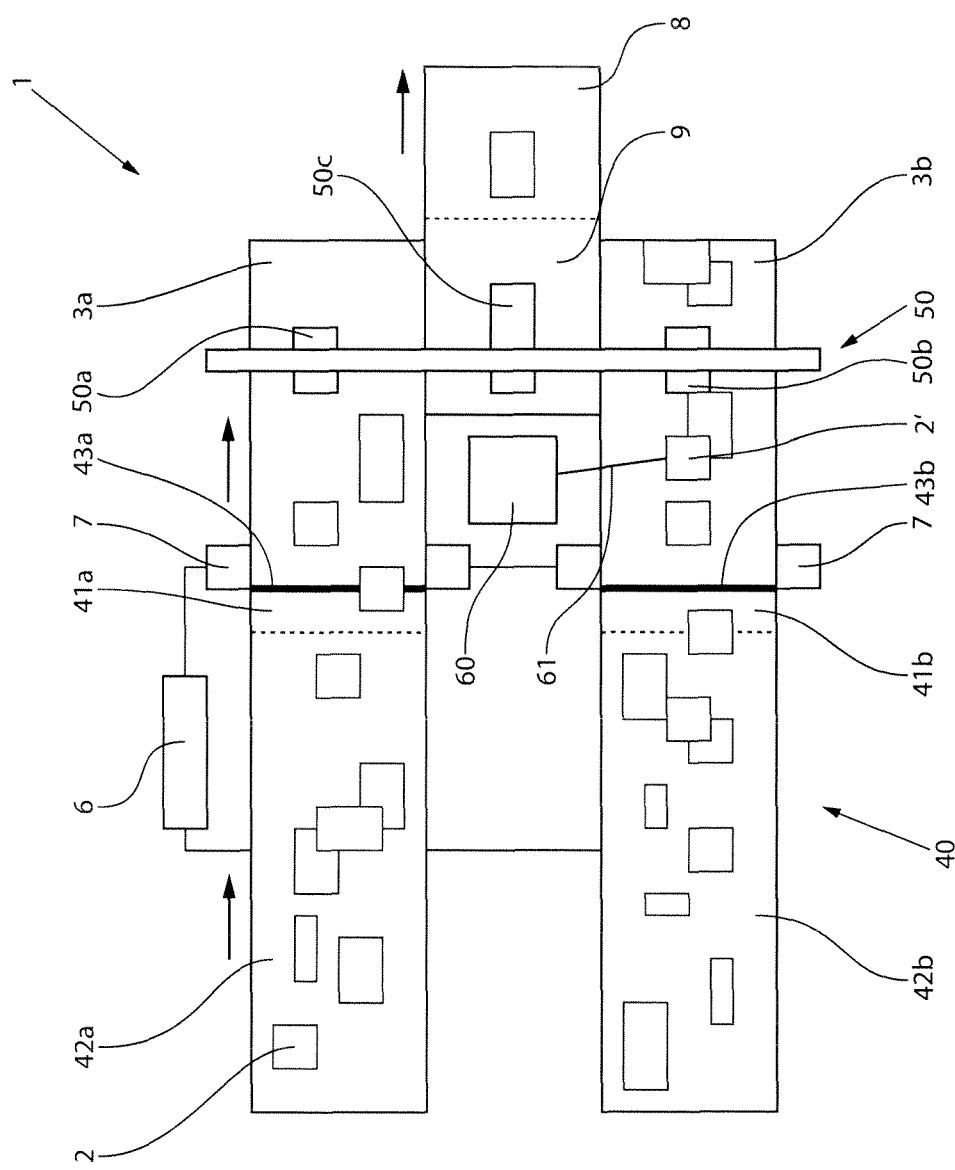
FIG. 1 is a schematic top view of an embodiment of a piece goods separating apparatus.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Piece goods separating machines can be usable to make a number of box-shaped piece goods of a wide variety of dimensions, particularly pharmaceutical packages, which are initially located in a receiving bin, individually available such that after detecting their dimensions and after identification, they can be stored in an automated storage facility. With a typical conveying system, a step conveyor or a conveyor belt, for example, conveys the piece goods out of the bin consecutively upwards at an angle so that the piece goods pass across a top edge of the step conveyor or the conveyor belt, and then fall onto a bearing surface. The bearing surface is formed by an upper side of a plate made of a transparent or translucent material. A camera arranged below the plate generates an image, wherein the camera is focused such that it captures the upper side taken up by the box-shaped piece goods from below. From the recorded images, both identifying data of the seated piece goods and the orientation and position thereof is detected. By using the data obtained in this way, a suction gripper taking hold of the piece goods from above is actuated, which grips individual packages and delivers them to the automated storage facility.

With a typical conveying system, about 150 packages per hour can be separated. If pharmaceutical packages are to be separated by module of the apparatus, the separation capacity of the aforementioned apparatus is adequate for standard pharmacies. However, if the automated storage facility is operated by a distribution center for pharmaceuticals, or by a hospital pharmacy, for example, the separation capacity of the known apparatus is insufficient.

Accordingly, a separating apparatus for piece goods to be stored in an automated storage facility is provided. The separating device may have at least two bearing surfaces for receiving piece goods and a conveying system for filling the bearing surfaces with piece goods. The conveying system may be provided with transfer surfaces dedicated to the bearing surfaces via which piece goods are transferred to the bearing surfaces. The conveying system may be configured such that the bearing surfaces may be filled with piece goods separately from one another, that is, that at one point in time, only one of two bearing surfaces is being filled with piece goods by way of the conveying system, for example. Subject to the precise mode of operation of the apparatus, the bearing surfaces may be loaded with preferably only one article of piece goods, or with a plurality of piece goods.

The conveying system may be coupled to a control unit, wherein the control device actuates the conveying system for a targeted filling of the bearing surfaces. That is, the control unit controls which bearing surface will be filled with piece goods and when the bearing surface will be filled. The control unit may be coupled to a detection device for detecting the position, orientation, and package data (and optionally, dimensions) of the piece goods. The detection device may include multiple detection devices, and may detect the aforementioned data in any suitable manner. For example, the detection device may include one or more cameras, which interact with associated image processing software for obtaining the aforementioned data.

The separating apparatus may further include a handling mechanism coupled to the control unit for gripping piece goods from the bearing surfaces and depositing the piece goods on a transport device. The transport device for receiving and forwarding the piece goods to or within the automated storage facility is in itself not necessarily a part of the separating apparatus, though the transport device interacts with the separating apparatus. Thus, the transport device may be provided by the separating apparatus itself or by the automated storage facility. The transport device may be an "active" transport device (e.g., a conveyor belt) or a "passive" transport device (e.g., a chute).

With the at least two bearing surfaces, which may be filled with piece goods separately from one another, and from which, independently from one another, piece goods may be removed, detected, and conveyed to the transport device, the separating apparatus provides two parallel separation paths. For example, with a separating apparatus having two bearing surfaces, piece goods may be conveyed to the first bearing surface, and at the same time, piece goods already located on the second bearing surface, may be detected and separately conveyed to the transport device. Once all piece goods on the second bearing surface have been processed, that is, detected and transferred to the transport device, the apparatus may instantly start with the separation of the piece goods that have meanwhile been moved onto the first bearing surface. Thus, it is not necessary to wait for the first bearing surface to be filled with piece goods. In this way, the speed of the overall separating process may be significantly increased (e.g., more piece goods per hour can be separated).

The bearing surfaces of the separating apparatus are filled with piece goods via the conveyor device. Knowing the functional mode of the conveying system and the bearing surfaces, which may be provided by a conveyor belt or a tiltable surface, for example, the filling of the bearing surfaces with piece goods may be time-dependently controlled. That is, for a time period t1, piece goods may be moved onto a bearing surface, and it is then assumed that the bearing surface is adequately filled. However, with this time-dependent filling of the bearing surfaces with piece goods, an optimal filling of the bearing surfaces is not guaranteed. In a preferred embodiment of the separating apparatus, the separating apparatus includes a sensor device coupled to the control unit for detecting the fill level of the bearing surfaces. The sensor device ensures that the filling of the bearing surface is only discontinued when an optimal fill level has been attained. The optimal fill level is subject to details of the separating apparatus itself (e.g., the arrangement of the bearing surfaces and the configuration of the handling mechanism).

Dependent on exactly how the apparatus is operated, however, it may also be provided that immediately after moving only one article of piece goods onto a bearing surface, the further filling of the bearing surface is stopped, and another bearing surface is filled.

The sensor device may be a light barrier or a proximity sensor, for example. An optical sensor, which detects the movement of an article of piece goods onto the bearing surface or the occupancy of the bearing surface, may also be used for a sensor device.

The orientation, and on a regular basis, at least roughly, the dimension of the piece goods on the bearing surface may be determined by the sensor device. Based on the detected data regarding the orientation and dimension of the article of piece goods, the handling mechanism may be actuated to remove the article of piece goods from the bearing surface. For this purpose, the handling mechanism may be provided with a jaw gripper, or a suction gripper, for example. Preferably, the handling mechanism includes multiple gripping module, which are activated based on the type of piece goods to be gripped.

During the detection of the orientation and dimension of the article of piece goods on the bearing surface, it is frequently not possible to identify the article of piece goods because the identifier of the article of piece goods (a barcode, for example) can often not be detected. After removing the article of piece goods from the bearing surface, it is conveyed, if necessary, to the detection device, which reads the data of the article of piece goods. These data are the identifier of the article of piece goods, and if applicable, the dimensions of the article of piece goods. For this purpose, the article of piece goods may be moved by the handling mechanism, that is, in front of the detection device in preset sequences of movement, wherein the sequences of movement depend on when all necessary data are detected. If based on the identifier, the dimensions may be assumed (for example, based on a database of the control unit of the apparatus or the storage facility), detecting the actual dimensions is no longer necessary.

During the detection of additional data of the gripped article of piece goods by the detection device, the detection device cannot be used to determine the orientation, position, and/or dimension of a further article of piece goods to be gripped on the bearing surface if the detection device only includes one detector. In a preferred embodiment of the separating apparatus, it is therefore provided that the detection device is provided with an object detection module (e.g., detector) and a data acquisition module. The object detection module is responsible for determining the orientation, position, and optionally, dimension of an article of piece goods. Here, the data provided by the object detection module may be used for gripping the article of piece goods with the handling mechanism. The data acquisition module may be used to detect further data (e.g., the identifier), and optionally, the dimension of the article of piece goods.

The separating apparatus may include at least two bearing surfaces, which are operated in parallel. An object detector may be assigned to the bearing surfaces, and arranged or disposed such that it can detect the orientation, position, and optionally, the dimension of an article of piece goods on each bearing surface. To this end, the object detector may be moved between the individual bearing surfaces on a guide module, for example. However, in a preferred embodiment, it is provided that to each bearing surface, an object detector is assigned. With a configuration such as this, the array of the object detection device is simplified. Furthermore, with a configuration such as this, it is possible to detect, with the use of the object detector, orientation, position, and dimension of different articles of piece goods on a bearing surface that was just filled, while piece goods are still being removed from another bearing surface for which the object detector assigned to the other bearing surface is required.

In order to simplify the identification of the piece goods on the bearing surfaces, it is preferred that the piece goods are positioned on the bearing surface only next to one another and not on top of one another. In order to achieve a pre-separation of the piece goods, it is provided in a preferred embodiment of the separating apparatus that the conveying system has a number of conveyors corresponding to the number of bearing surfaces. For each conveyor, a transfer surface is arranged and any transfer devices are configured such that the bearing surfaces may be filled with piece goods separately from one another. The conveying module may also be conveyor belts or step conveyors that may be controlled separately from one another, for example.

A holder may be assigned to each of the conveyors. This is advantageous if the conveyors cannot be controlled separately from one another. If on a bearing surface, no further piece goods are to be moved, the holder is correspondingly moved into the conveying path to the bearing surface no longer to be filled so that, via the conveyor, piece goods are only moved to other bearing surfaces.

In some embodiments, it is provided that the conveying system includes at least one conveyor having multiple transfer surfaces and a piece goods flow divider, which may block the transfer surfaces separately from one another so that the bearing surfaces may be filled with piece goods separately from one another.

By way of suitable devices, the conveyor may be filled in batches with a certain number of piece goods, which distribute themselves on the conveyor and are then conveyed to the bearing surfaces, for example. In a preferred embodiment, it is provided that the separating apparatus has a piece goods feeder located upstream of the conveyor, by way of which piece goods are conveyed to the conveyor. By way of the piece goods feeder, the piece goods may, in a controlled manner, be conveyed to those conveyors that have a sufficient receiving capacity. Further, the piece goods feeder may store a great number of piece goods so that the separating apparatus can be operated over a longer period of time without renewed introduction of new piece goods.

With respect to the arrangement of the transport device regarding the bearing surfaces, in a preferred embodiment, bearing surfaces are arranged in parallel and spaced apart from one another. This allows for a particularly simple structural configuration of the separating apparatus. The handling mechanism may then be arranged centrally between the bearing surfaces so that only short distances from the bearing surfaces to the transport device have to be covered. If the separating apparatus includes more than two bearing surfaces, two or more transport devices may be used.

The bearing surfaces may have different configurations. In example embodiments, a bearing surface is an inclined bearing plate, which may be coupled to an actuating device. In example embodiments, the bearing surface may be provided by a belt conveyor. In other embodiments, care should be taken that the piece goods can be moved on, or onto, the bearing surface such that they remain within the action radius of the handling mechanism.

A piece good separating method is provided. Here, the conveying system is initially provided with piece goods (e.g., on a piece goods feeder) on which a larger number of piece goods can be stored temporarily. In other examples, the piece goods are made available to the piece goods feeder via a piece goods bin, or directly to the conveyor.

Via a first conveying path, piece goods are moved by the conveying system onto a first bearing surface, and the position and orientation of the piece goods on the first repository are determined. Piece goods are seized from the first bearing surface by the handling mechanism and are conveyed to the detection device, i.e., guided past the detection device (method step c1). The detection device reads data of the piece goods, and piece goods are deposited by the handling mechanism onto the transport device.

The moving of the piece goods onto the bearing surface may be done such that always only one article of piece goods is moved onto the bearing surface, which will then be processed further (determine orientation, position, seize article of piece goods, read data, deposit article of piece goods on the transport device). In some embodiments, in this way, piece goods may be moved onto the bearing surface until it is "full," and only then, the further processing of the piece goods takes place.

Determining the position and orientation of the piece goods is done with the aid of the detection device, as has already been described above with reference to the separating apparatus. Once the orientation and position of an article of piece goods has been detected, it may be gripped by the handling mechanism and conveyed to the detection device, which reads data of the piece goods.

Whenever the term "piece goods" is mentioned in a method step, it does not mean that several piece goods are seized simultaneously, for example, by the handling mechanism, but rather, that individual articles of piece goods are seized consecutively by the handling mechanism and are conveyed to the detection device. The same holds true for other (but not all) method steps.

In some embodiments, piece goods are moved by the conveying system to a second bearing surface via a second conveying path, and the position and orientation of the piece goods on the second bearing surface are determined. The piece goods are gripped from the second bearing surface by the handling mechanism and are conveyed to the detection device, or guided past the detection device, which reads data of the piece goods. Thereafter, the piece goods are deposited on the transport device by the handling mechanism.

The individual steps of the two conveying paths may be temporally coordinated with one another such that steps of each conveying path are carried out consecutively, or coordinated. That is, after all piece goods on the first bearing surface have been gripped by the handling mechanism, have been conveyed to the detection device, and have been deposited by the handling mechanism on the transport device, then the piece goods on the second bearing surface are gripped from the second bearing surface by the handling mechanism, are conveyed to the detection device, and are deposited by the handling mechanism on the transport device. At the same time, the first, now empty bearing surface is being filled with other piece goods.

In other words, a processing of any arbitrary bearing surface may be initiated as soon as the processing of another bearing surface is finished, regardless of how many piece goods were deposited on a bearing surface. Since, in this example, the processing of a bearing surface takes place immediately following the processing of another bearing surface, there is no need to wait until the normally provided one support surface has been filled anew with piece goods, and significantly more piece goods can be separated per time interval.

In a preferred embodiment of the method, the position and the orientation of the piece goods on the bearing surfaces are detected by separate object detection units. In a further preferred embodiment, the data of the piece goods are read by a data acquisition unit.

FIG. 1 shows an embodiment of a separating apparatus 1 that includes two parallel bearing surfaces 3a, 3b, between which a transport device 8 for receiving and forwarding piece goods 2 is arranged, the transport device 8 not being a part of the separating apparatus 1. Between the bearing surfaces 3a, 3b, a handling mechanism 60 for gripping piece goods 2 from the bearing surfaces 3a, 3b and for depositing the piece goods 2 on the transport device 8 is arranged or disposed. It is indicated in the embodiment shown that the handling mechanism 60 has taken hold of an article of piece goods 2' by way of a gripper 61. To grip piece goods 2, the handling mechanism 60 may be provided with any suitable gripper 61, such as a suction gripper or a jaw gripper, for example.

Above the bearing surfaces 3a, 3b as well as the transport device 8, a detection device 50 having two object detectors 50a, 50b, which are dedicated to the bearing surfaces 3a, 3b, and a data acquisition module 50c is arranged.

As soon as an article of piece goods 2 has been gripped by the handling mechanism 60, the gripped piece good 2 is moved to or guided past the data acquisition module 50c by the handling mechanism 60, and using the data acquisition module 50c, an identifier of the article of piece goods 2 is read. The identifier may be a barcode or an RFID tag, for example, wherein the data acquisition module 50c is adapted to the type of identifier used. The data acquisition module 50c may also include multiple components for reading data if it is to be expected that piece goods 2 having different identifiers will be present. If need be, the dimensions of the article of piece goods 2 are also captured, and subsequently, the piece good 2 will be deposited in a receiving area 9 of the transport device 8. However, detecting the dimensions is only necessary if the separating apparatus 1 or the automated storage facility is not familiar with the dimensions on the basis of the identifier.

Located upstream of the bearing surfaces 3a, 3b is a conveying system 40, which in the shown embodiment is provided with two conveyors 42a, 42b. The conveyors 42a, 42b are each provided with a transfer surface 41a, 41b, which abut the bearing surfaces 3a, 3b. By use of the transfer surfaces 41a, 41b, piece goods 2 are moved from the conveyors 42a, 42b onto the bearing surfaces 3a, 3b. In the embodiment shown, a holder 43a, 43b is assigned to each transfer surface 41a, 41b, via which the transport path between the conveyors 42a, 42b and the bearing surfaces 3a, 3b may be blocked, which is necessary if the conveyors 42a, 42b cannot be controlled separately from one another, which, however, is not the case in the illustrated embodiment.

The conveyors 42a, 42b are coupled to a control unit 6, which in turn is coupled to a sensor 7. The sensor 7 detects the fill level and/or the arrival of an article of piece goods 2 on one of the bearing surfaces 3a, 3b. Subject to the fill level of the bearing surfaces 3a, 3b, the conveyors 42a, 42b are actuated by the control unit 6 in order to move additional piece goods 2 onto the bearing surfaces 3a, 3b if full capacity has not been reached yet, when a filling of the bearing surfaces 3a, 3b with several piece goods 2 is desired. However, if only one article of piece goods 2 is to be moved onto a bearing surface 3a, 3b, an addition infeed is prevented via the control unit 6 as soon as it is ascertained that an article of piece goods 2 has been delivered. The conveyors 42a, 42b are supplied with piece goods 2 by way of additional (not illustrated) input devices (e.g., additional conveyors).

Figure 2:
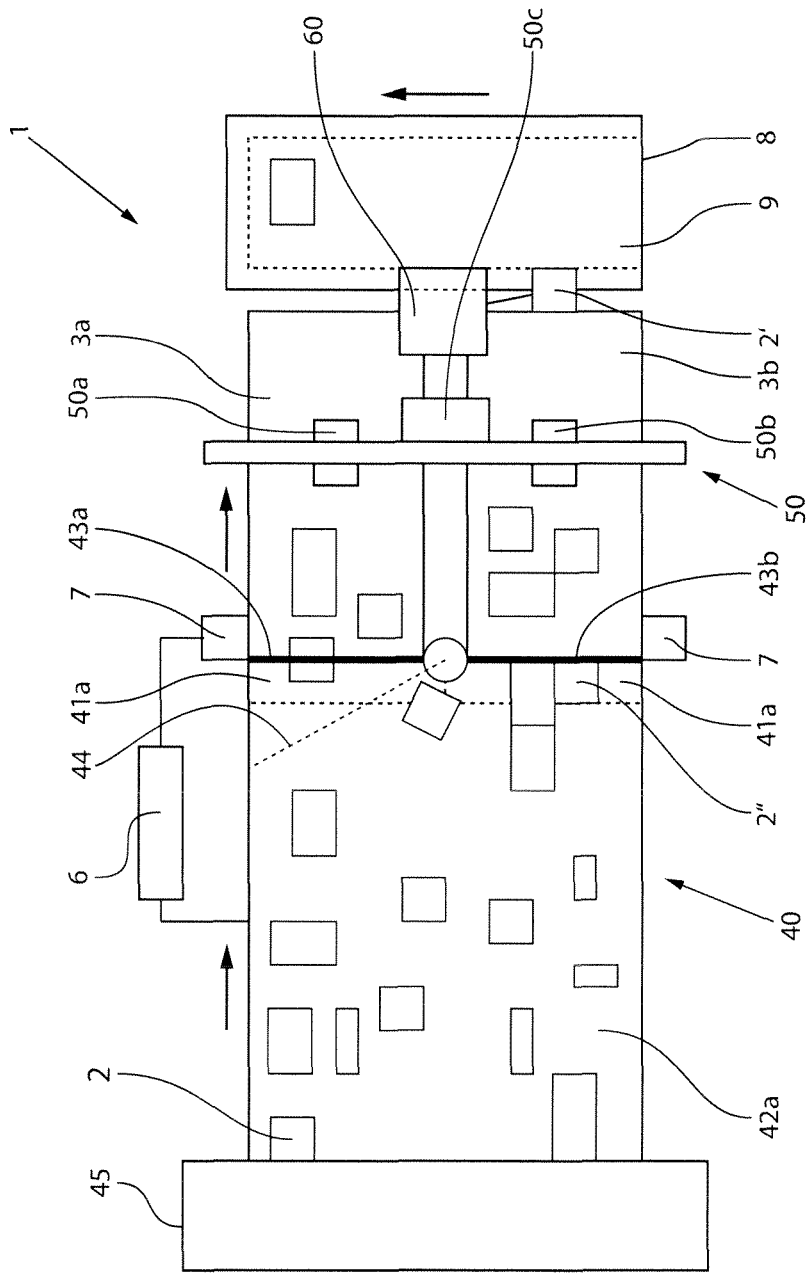
FIG. 2 is a schematic top view of another embodiment of a piece goods separating apparatus.

FIG. 2 shows an embodiment of a separating apparatus 100 that includes two bearing surfaces 3a, 3b arranged in parallel, above which the detection device 50 having two object detectors 50a, 50b and the data acquisition module 50c is arranged. At the right end of the bearing surfaces 3a, 3b, a transport device 8 is arranged, in the receiving area 9 of which piece goods 2 are deposited by the handling mechanism 60, which is arranged between the bearing surfaces 3a, 3b. In this embodiment, the handling mechanism 60 may be provided with a jaw gripper or a suction gripper, with which piece goods 2' can be gripped, be conveyed to the data acquisition unit 50c for reading the required data, and be deposited in the receiving area 9 of the transport device 8.

In the illustrated embodiment, a conveying system 140 includes only one conveyor 142a having two transfer surfaces 141a, 141b, via which piece goods can be moved from the conveyor 142a onto the bearing surfaces 3a, 3b.

Assigned to each transfer surface 41a, 41b is a holder 43a, 43b, which may interrupt the transport path from the conveyor 142a onto one of each bearing surface 3a, 3b. In the embodiment shown, the holder 43b may be moved downward into the conveying path such that no piece goods 2 can get from the conveyor 142a onto the bearing surface 3b. For example, the article of piece goods 2" abuts the holder 43b, and despite the movement of the conveyor 142a, does not get moved onto the bearing surface 3b. The holder 43a may be moved upwards from the conveying path so that piece goods 2 may be moved from the conveyor 142a onto the bearing surface 3a.

In some embodiments, the holder may also be configured as a pivotable holder 44, which is swiveled to and fro between the transfer surfaces 41a, 41b, so that one conveying path from the conveyor 142a onto a bearing surface 3a, 3b is always blocked. The pivoting path of the holder 44 must thereby be adapted to the exact structural conditions. For example, it may be necessary to lift the holder 44 prior to swiveling.

Assigned to the conveyor 142a is a piece goods feeder 45, by which piece goods 2 may be moved onto the conveyor 142a. As in the previously described embodiment, the separating apparatus 100 includes a control unit 6, which is coupled to the conveyor 142a and the bearing surfaces 3a, 3b. In addition thereto, the control unit 6 is coupled to the detection device 50 and the handling mechanism 60 to control the detecting, gripping, identifying, and depositing of the piece goods 2.

Figure 3:
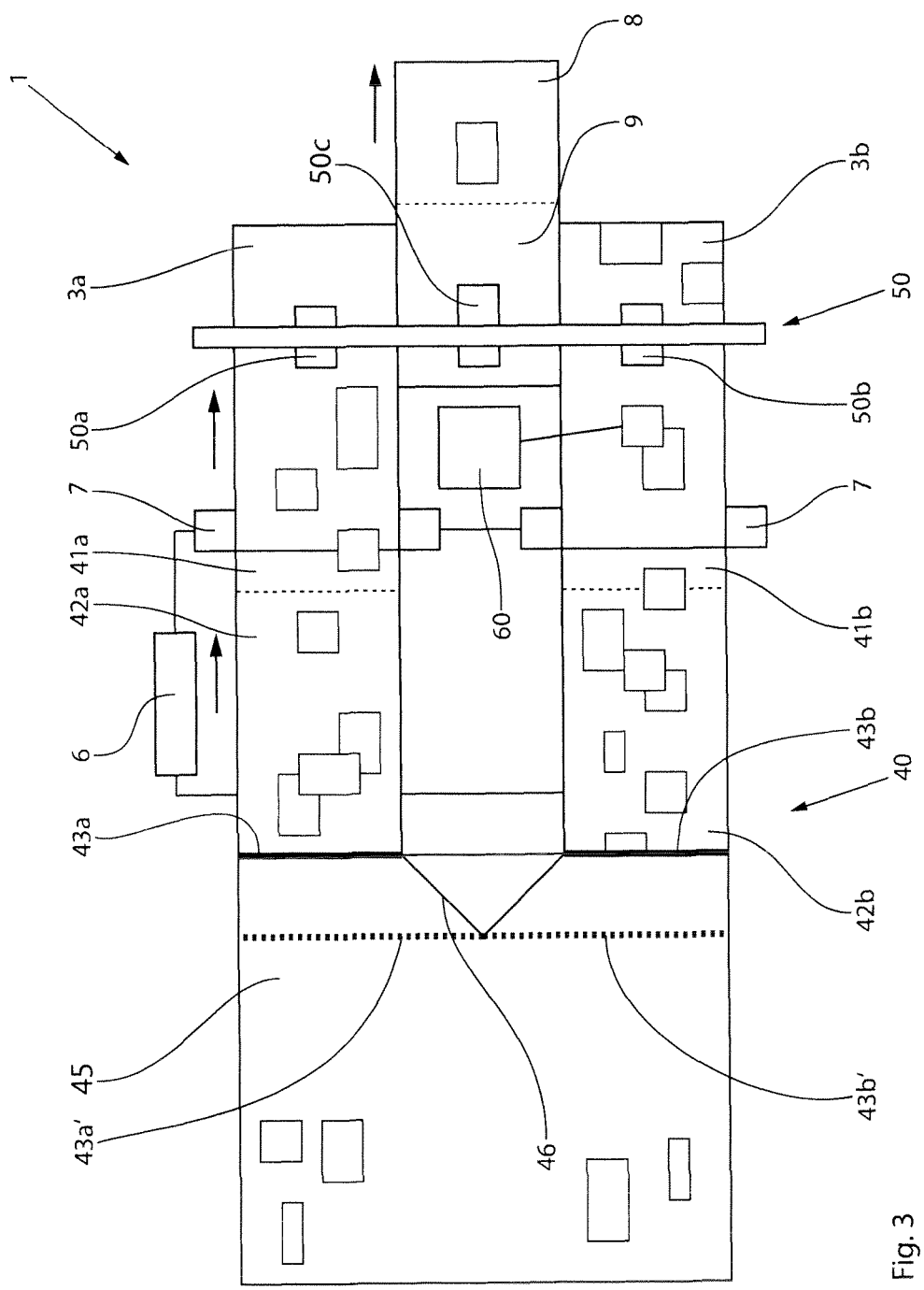
FIG. 3 is a schematic top view of another embodiment of a piece goods separating apparatus.

FIG. 3 shows an embodiment of a separating apparatus 200, which essentially corresponds to the embodiment in FIG. 1, with the difference, however, that a piece goods feeder 245 is assigned to the conveyors 42a, 42b, which in this embodiment is configured as a further conveyor belt, by way of which piece goods are moved onto the conveyors 42a, 42b. In this embodiment, holders 43a, 43b are arranged between the piece goods feeder 245 and the conveyors 42a, 42b, by way of which the movement of piece goods 2 onto the conveyors 42a, 42b may be restricted. At the transition from the piece goods feeder to the conveyors 42a, 42b, a piece goods flow divider 46 is arranged in the central area of the piece goods feeder 245, which ensures that the piece goods 2 in the central area are guided in the direction of the transfer areas 43a', 43b' assigned to the conveyors 42a, 42b of the piece goods conveyor.

In this embodiment, no holders are assigned to the transfer surfaces 41a, 41b, thus, the conveying path as such cannot be blocked. This makes it necessary that the conveyors 42a, 42b either be controlled separately so that the piece goods 2 may be moved onto the bearing surfaces 3a, 3b in a targeted manner, or that a blocking of the conveying path is done by way of the holders 43a, 43b arranged downstream of the piece goods feeder 245. In that case, the conveyors 42a, 42b are used as intermediate buffers, by which piece goods 2 are moved onto the bearing surfaces 3a, 3b as soon as all piece goods 2 have been removed therefrom, which can be detected using the detection device 50. As for the rest, the embodiment corresponds to the embodiment as shown in FIG. 1.

Figure 4:
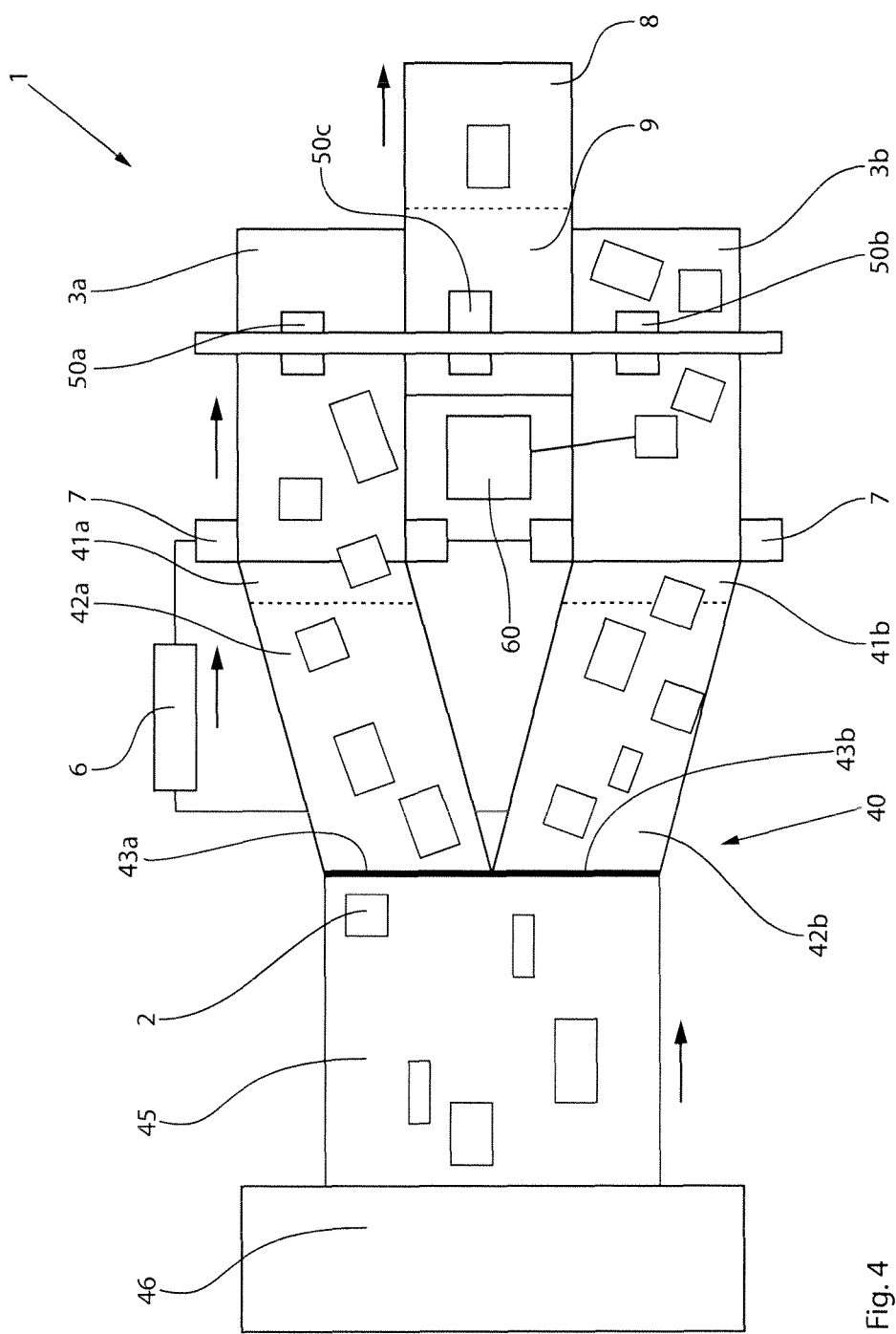
FIG. 4 is a schematic top view of another embodiment of a piece goods separating apparatus.

FIG. 4 shows an embodiment of a separating apparatus 300, which corresponds to a large extent to the embodiment according to FIG. 3. In the embodiment shown herein, the separating apparatus 300 includes the two conveyors 42a, 42b having two transfer surfaces 41a, 41b assigned to bearing surfaces 3a, 3b. However, unlike in the embodiment shown in FIG. 3, the conveyors 42a, 42b are not parallel, but are arranged at an angle to one another so that in the left area, they adjoin.

Upstream of the conveyors 42a, 42b, a piece goods feeder 345 is arranged, which in the illustrated embodiment is yet again configured as a conveyor belt. In addition, a piece goods bin 346 is assigned to the piece goods feeder 346, in which a larger stock of piece goods 2 may be stored. In this embodiment, conveyors 42a, 42b may also be configured as conveyor belts or step conveyors, wherein in the illustrated embodiment, conveyor belts are indicated. The remaining parts of the embodiment shown in FIG. 4 correspond to the embodiments already illustrated in FIGS. 1 and 3.

Figure 5:
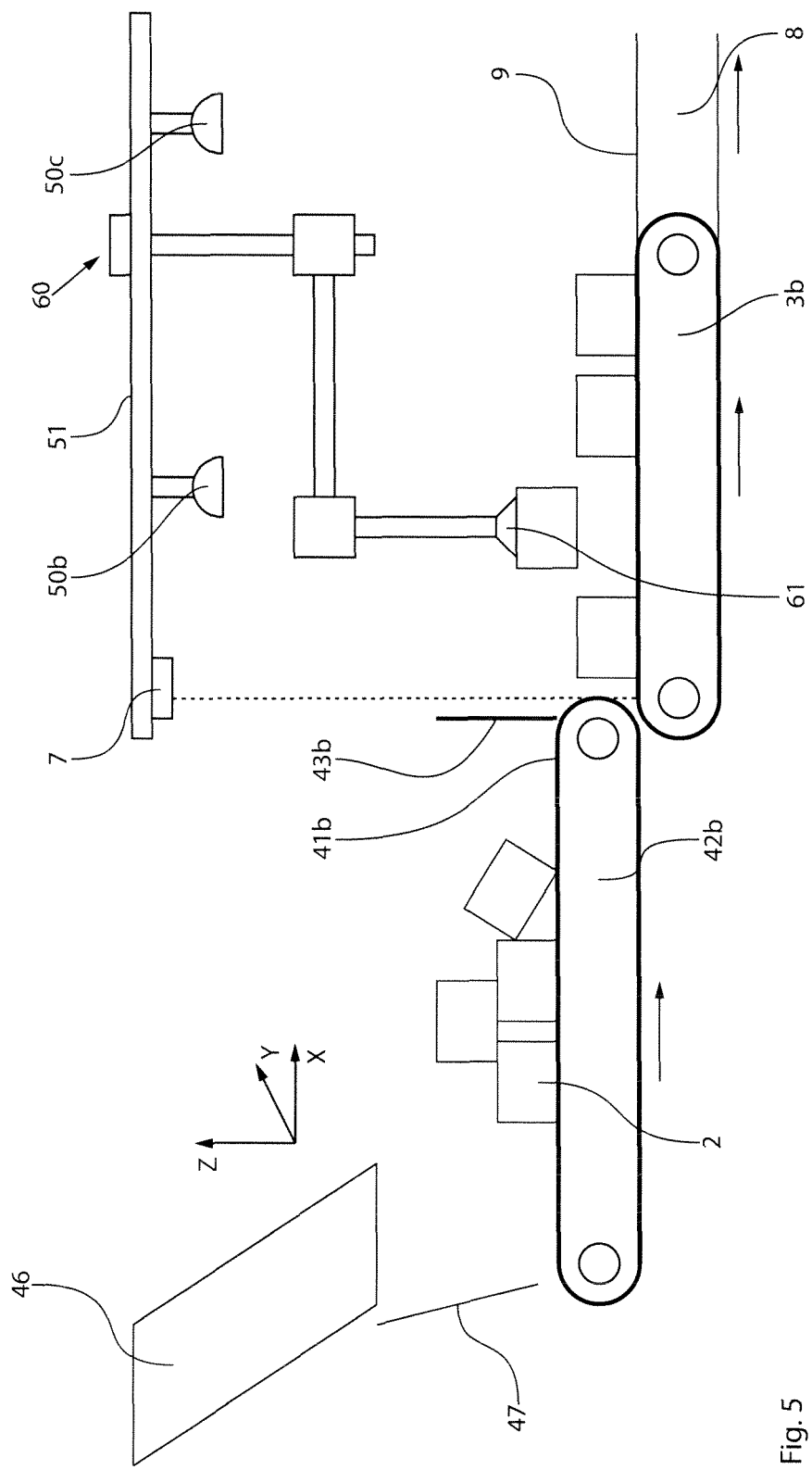
FIG. 5 is a schematic top view of another embodiment of a piece goods separating apparatus.

FIG. 5 shows a side view of the separating apparatus 1. On the left side of FIG. 5, a conveyor 42b configured as a belt conveyor can be discerned, on which a number of piece goods 2 are arranged. Via conveyor 42b, the piece goods 2 are moved, individually or in groups, onto the bearing surface 3b. On the bearing surface 3b, orientation and position of the piece goods 2 are detected by the object detector 50b, wherein the object detector 50b interacts with appropriate software in order to detect the orientation and position of the individual piece goods 2 on the bearing surface 3b.

Once the orientation and position of an article of piece goods 2 has been determined, it is gripped by a gripper 61 of the handling mechanism 60. In the embodiment shown, the gripper 61 is indicated as a suction gripper arranged at the end of the handling mechanism 60. Using the suction gripper 61, or the handling mechanism 60, the piece goods 2 are conveyed to the data acquisition module 50c, or guided past the same, and with the data acquisition module 50c, the identifier of the article of piece goods 2 is read. If necessary, in addition thereto, the dimensions of the article of piece goods 2 may be detected using the data acquisition module 50c if the separating apparatus 1 does not already have this data on the basis of the identifier. An exact determination of the dimensions may also be omitted if a control unit of a downstream automated storage facility (not shown) can determine the dimensions by use of a database based on the transmitted data of the identifier.

Once the article of piece goods 2 is identified, it is deposited by the handling mechanism 60 on a receiving area 9 of the transport device 8. With the aid of the transport device 8, the piece goods 2 are moved into an automated storage facility, where with a suitable operating device, the piece goods 2 are deposited at their assigned storage locations. The exact determination of the storage location is done be a control unit of the storage facility since the storage location is subject to the occupancy of the storage facility.

A piece goods feeder 46 is assigned to the conveyor 42b, which in the shown embodiment is configured as a chute. In order to prevent the piece goods 2 from dropping, a wall 47 is arranged at the end of the conveyor 42b.

With the aid of the sensor 7 arranged at the detection device 50, it may be detected when an article of piece goods 2 is being moved onto the bearing surface 3b. The sensor 7 may be configured as a simple light barrier, for example. As another example, the sensor 7 may also sense the total occupancy of the bearing surface 3b. In another example, the functions of the sensor 7 may also be taken over by the object detector 50b.

In the embodiments shown, the conveyors have been indicated to be conveyor belts. However, a corresponding design is not required; the conveyors may be configured as step conveyors, for example, or comparable conveying means known to those skilled in the art. Likewise, the bearing surfaces have always been illustrated as conveyor belts. Such a design of the bearing surfaces is likewise not absolutely necessary. As already indicated, the bearing surfaces may also be provided by tiltable planes, for example. At least in the event that several piece goods are to be moved onto the bearing surfaces, it is preferred that the bearing surfaces be configured such that piece goods may be moved away from the transfer area in order to avoid a jamming of the piece goods. In a simple case, this may be achieved using an inclined surface, for example, at the end of which a stop for the piece goods located thereupon is provided.

Figure 6:
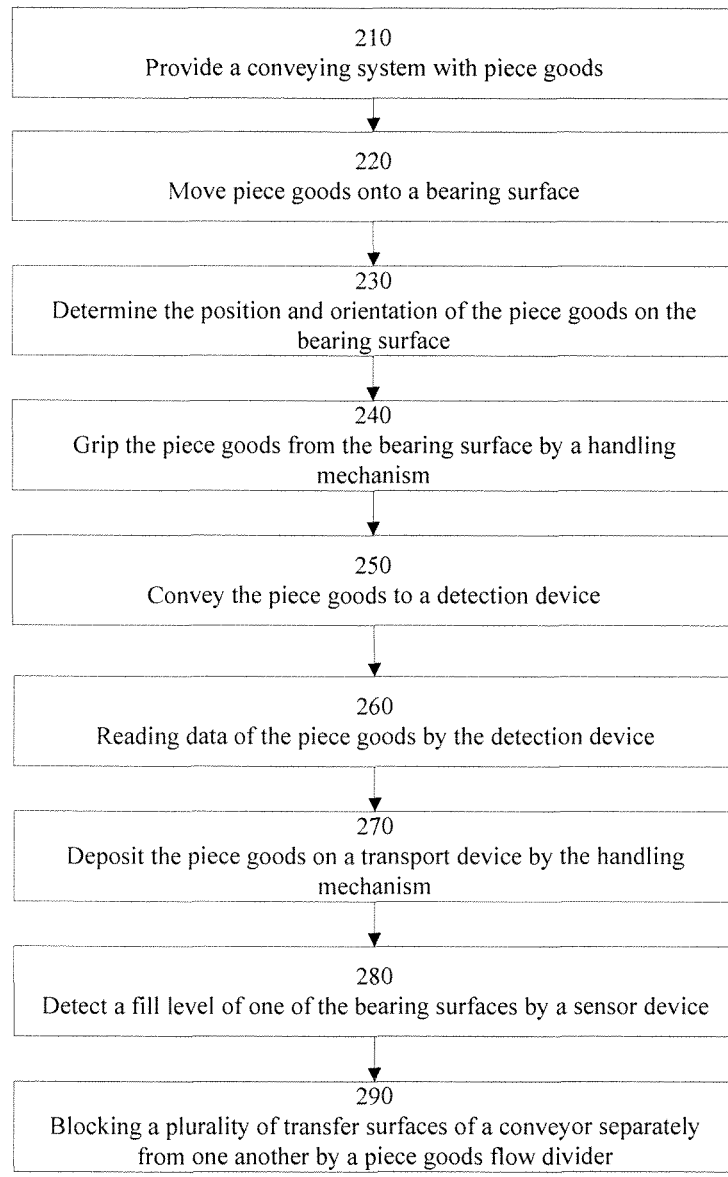
FIG. 6 is a flow chart illustrating steps in a method for separating piece goods, according to some embodiments.

FIG. 6 shows a flow chart illustrating steps in a method 200 for separating piece goods, according to some embodiments. Method 200 may be performed in connection with a piece goods separating apparatus or device consistent with the present disclosure (e.g., separating apparatus 1). Accordingly, the piece goods separating apparatus or device in method 200 may include a conveying system (e.g., conveying system 40) having first and second conveying paths. Via each of the conveying paths, the piece goods separating apparatus or device may move piece goods (e.g., piece goods 2) onto a bearing surface (e.g., bearing surfaces 3a, 3b) by the conveying system, determine the position and orientation of the piece goods on the bearing surface, grip the piece goods from the bearing surface by a handling mechanism (e.g., handling mechanism 60), convey the piece goods to a detection device (e.g., detection device 50), read data of the piece goods by the detection device, and deposit the piece goods on a transport device (e.g., transport device 8) by the handling mechanism. A fill level of one of the bearing surfaces may be detected by a sensor device (e.g., sensor 7). A plurality of transfer surfaces (e.g., transfer surfaces 41a, 41b) of a conveyor (e.g., conveyor 42a, 42b) may be separately blocked from one another by a piece goods flow divider (e.g., piece goods flow divider 46) so that the piece goods may be provided to each of the bearing surfaces separately from one another.

Steps in method 200 may be performed at least partially by an operator, medical personnel, or a healthcare professional in a healthcare facility or in a drugstore, or in a pharma manufacturing facility. Accordingly, method 200 may be part of a medicament management or a drug logistic prepared by a physician or a healthcare professional. Moreover, method 200 may be performed automatically upon execution of a command provided by or controlled by a healthcare professional. For example, steps in method 200 may be programmed or directed with commands on computer-readable media, which, in some embodiments, can comprise non-transitory computer readable media.

Methods consistent with the present disclosure may include at least one of the steps illustrated in FIG. 6, performed in any order. In some embodiments, a method may include at least two of the steps illustrated in FIG. 6 performed overlapping in time, or even simultaneously. Moreover, embodiments consistent with the present disclosure may include at least one but not all of the steps illustrated in FIG. 6. Furthermore, methods consistent with the present disclosure may include more steps, in addition to at least one of the steps illustrated in FIG. 6. In some embodiments, one or more steps may be repeated.

Step 210 includes providing a conveying system with piece goods. Step 220 includes moving piece goods onto a bearing surface by the conveying system. Step 230 includes determining the position and orientation of the piece goods on the bearing surface. Step 240 includes gripping the piece goods from the bearing surface by a handling mechanism. Step 250 includes conveying the piece goods to a detection device. Step 260 includes reading, by the detection device, data of the piece goods. Step 270 includes depositing the piece goods on a transport device by the handling mechanism. In some embodiments, steps 220-270 are performed on each of first and second conveying paths. In some embodiments, steps 240-260 are time-coordinated with one another such that the gripping, conveying and reading of the piece goods are carried out consecutively by the first and second conveying paths. Step 280 includes detecting a fill level of one of the bearing surfaces by a sensor device. Step 290 includes blocking a plurality of transfer surfaces of a conveyor separately from one another by a piece goods flow divider so that the piece goods are provided to each of the bearing surfaces separately from one another.

It is understood that any specific order or hierarchy of blocks in the methods of processes disclosed is an illustration of example approaches. Based upon design or implementation preferences, it is understood that the specific order or hierarchy of blocks in the processes may be rearranged, or that all illustrated blocks be performed. In some implementations, any of the blocks may be performed simultaneously.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112 (f) unless the element is expressly recited using the phrase "module for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way.

What is claimed is:

1. An apparatus for separating piece goods to be stored in an automated storage facility, comprising:
   at least two bearing surfaces configured to receive piece goods;
   a conveying system configured to provide the piece goods to the bearing surfaces, the conveying system comprising one or more transfer surfaces dedicated to the bearing surfaces and configured to transfer the piece goods to the bearing surfaces, at least one conveyor having a plurality of transfer surfaces, and a piece goods flow divider configured to block the plurality of transfer surfaces separately from one another so that the piece goods may be provided to the bearing surfaces separately from one another;
   a control unit coupled to the conveying system, the control unit configured to actuate the conveying system for a targeted provision of the piece goods to the bearing surfaces;
   a detection device coupled to the control unit, the detection device configured to detect a position, an orientation, and package data of the piece goods;
   a handling mechanism coupled to the control unit, the handling device configured to grip the piece goods on the bearing surfaces and deposit the piece goods on a transport device; and
   a sensor device coupled to the control unit, the sensor device configured to detect the fill level of the bearing surfaces.

2. The apparatus of claim 1, the detection device comprising at least one object detector and one data acquisition module.

3. The apparatus of claim 2, wherein an object detector is assigned to each bearing surface.

4. The apparatus of claim 1, the conveying system comprising a number of conveyors corresponding to the number of bearing surfaces, wherein a transfer surface is disposed on each conveyor, the conveyors configured to provide the bearing surfaces with the piece goods separately from one another.

5. The apparatus of claim 4, further comprising a holder associated with each of the conveyors.

6. The apparatus of claim 4, the conveying system comprising a piece goods feeder disposed upstream of the conveyor, the piece goods feeder configured to convey the piece goods to the conveyor.

7. The apparatus of claim 1, wherein the bearing surfaces are configured in parallel and spaced apart from one another.

8. The apparatus of claim 1, wherein at least one bearing surface comprises a belt conveyor.

9. The apparatus of claim 1, wherein at least one bearing surface comprises an inclined bearing plate configured to be coupled to an actuating device.

10. A method for separating piece goods using a piece goods separating apparatus, the method comprising:
    providing a conveying system with piece goods, the conveying system comprising a first conveying path and a second conveying path;
    via the first conveying path:
      moving first piece goods onto a first bearing surface by the conveying system;
      determining the position and orientation of the first piece goods on the first bearing surface;
      gripping the first piece goods from the first bearing surface by a handling mechanism;
      conveying the first piece goods to a detection device;
      reading, by the detection device, data of the first piece goods; and
      depositing the first piece goods on a transport device by the handling mechanism;
    via the second conveying path:
      moving second piece goods onto a second bearing surface by the conveying system;
      determining the position and orientation of the second piece goods on the second bearing surface;
      gripping the second piece goods from the second bearing surface by a handling mechanism;
      conveying the second piece goods to the detection device;
      reading, by the detection device, data of the second piece goods; and depositing the second piece goods on the transport device by the handling mechanism; and detecting a fill level of one of the first and second bearing surfaces by a sensor device, wherein steps of the two conveying paths are time-coordinated with one another such that the gripping, conveying, and reading of the first piece goods are carried out consecutively in relation to the gripping, conveying, and reading of the second piece goods; and blocking a plurality of transfer surfaces of a conveyor separately from one another by a piece goods flow divider so that the first and second piece goods may be provided to the first and second bearing surfaces separately from one another.

11. The method of claim 10, wherein the position and the orientation of the first and second piece goods on the first and second bearing surfaces are detected by separate object detectors.

12. The method of claim 10, wherein the data of the first and second piece goods are read by a data acquisition module.

13. A device for separating piece goods, comprising:
a plurality of bearing surfaces configured to receive piece goods;
a conveying system configured to provide the piece goods to the plurality of bearing surfaces, the conveying system comprising at least one conveyor having a plurality of transfer surfaces and a piece goods flow divider configured to block the plurality of transfer surfaces separately from one another so that the piece goods may be provided to the bearing surfaces separately from one another;
a control unit configured to control a targeted provision of the piece goods to the plurality of bearing surfaces;
a detection device configured to detect at least one of a position, an orientation, and package data of the piece goods;
a handling mechanism configured to grip and deposit the piece goods on a transport device; and
a sensor device coupled to the control unit, the sensor device configured to detect the fill level of the bearing surfaces.

14. The device of claim 13, the conveying system comprising:
a separate conveyor associated with each of the plurality of bearing surfaces;
a transfer surface disposed on each separate conveyor; and
a holder associated with each separate conveyor.

15. The device of claim 14, wherein the conveying system is configured to provide a portion of the piece goods to each of the plurality of bearing surfaces separately from one another.

* * * * *